United States Patent Office 3,216,332
Patented Nov. 9, 1965

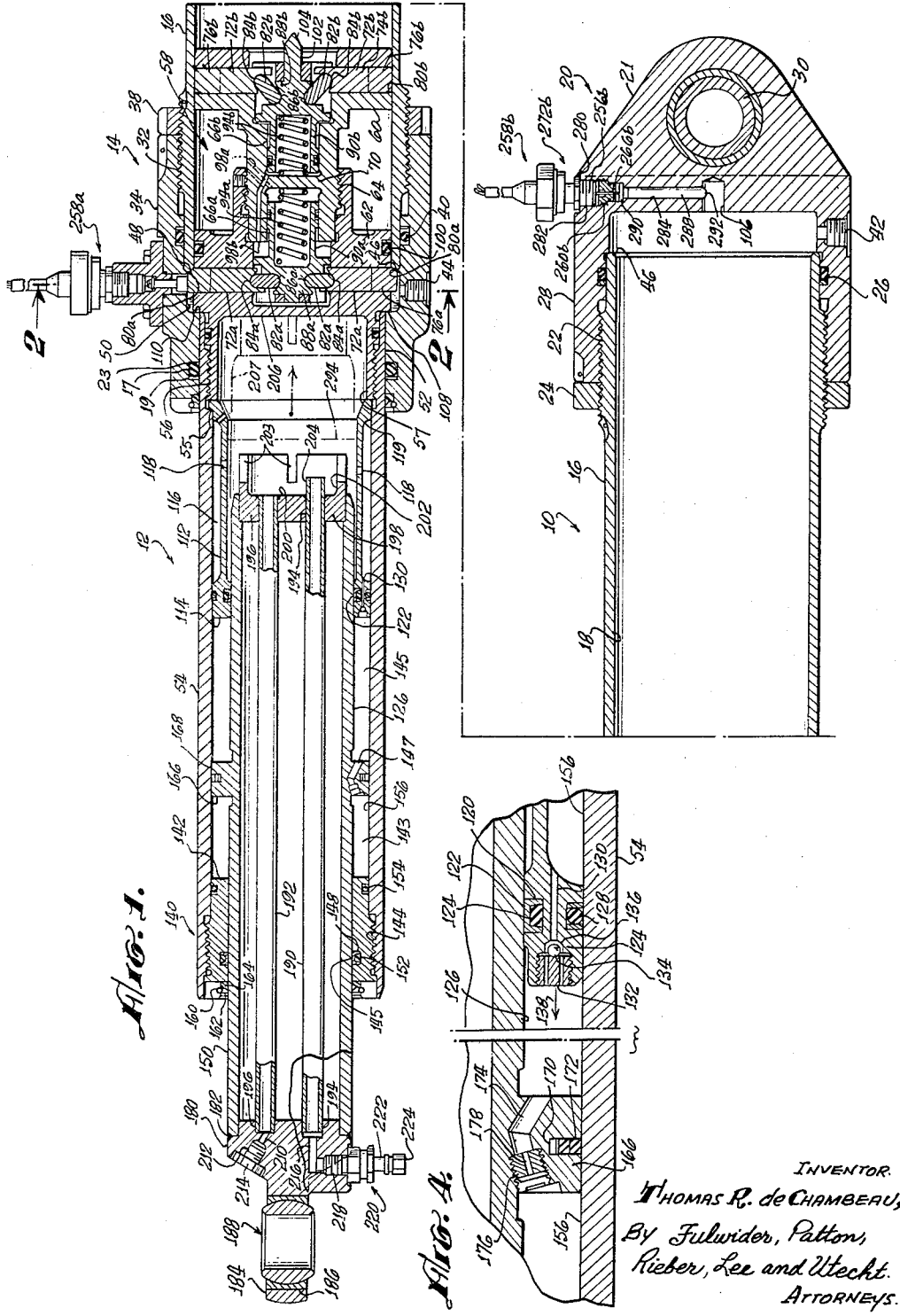

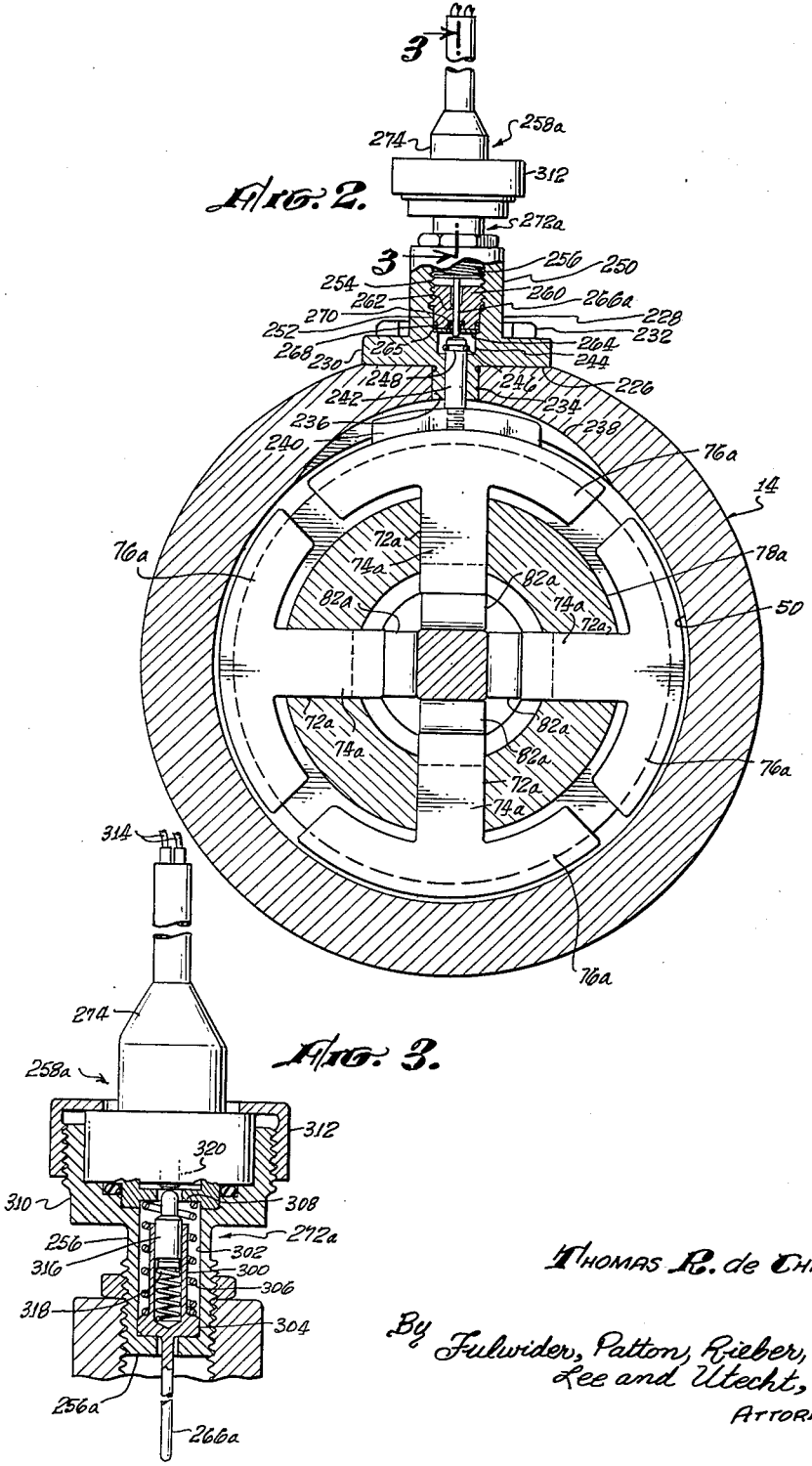

1

3,216,332
RETRACTABLE SHOCK STRUT
Thomas R. de Chambeau, Rolling Hills Estates, Calif.,
assignor to Lionel-Pacific, Inc., Gardena, Calif., a corporation of Delaware
Filed June 24, 1963, Ser. No. 290,081
13 Claims. (Cl. 92—5)

This invention relates in general to hydraulic running and landing gear shock absorbing and springing devices, and more particularly to a unitary retractable shock absorbing strut mechanism for use in connection with the running gear of vehicles and landing gear of aircraft.

Heretofore, it has been conventional practice to employ hydraulic actuator devices for extension and retraction of the running gear of vehicles such as amphibious landcraft, and the landing gear of amphibious or land aircraft, which is separate from their shock absorbing and springing mechanisms. In certain land and aircraft installations, considerable simplification of construction and saving of space and weight, as well as increased reliability can be accomplished by combining, in a single unit, both the shock strut and the hydraulic actuator for effecting the extension and retraction of the shock strut and the running gear wheels or other supporting means carried thereby.

It is, therefore, an important object of this invention to provide a unitary retractable shock strut.

It is another object of this invention to provide a combined shock absorbing strut and hydraulic actuator mechanism for extension and retraction thereof.

It is a still further object of this invention to provide an improved shock absorbing and springing strut adapted for use in conjunction with an extension and retraction actuator mechanism.

Shock absorbing and springing struts of the hydraulic type, as heretofore usually constructed, have been found to exhibit rapid temporary deterioration in their shock damping and smoothing characteristics when subjected to continuous shocks over an extended period of time, such as occurs in connection with use on the running gear of land vehicles or when subjected to a rapid succession of shocks, such as occur in connection with repeated landings and take-offs of aircraft, especially on rough surfaces.

It is, therefore, a further object of this invention to provide an improved hydraulic type shock absorbing and springing device.

It is also an object of this invention to provide a hydraulic actuator device having improved safety means for indicating completion of its actuating and stroke locking operations.

These and other objects, advantages, and features of novelty will be evident hereinafter.

In the drawings which illustrate a presently preferred embodiment of the invention:

FIGURE 1 is a longitudinal sectional view of a general assembly of the apparatus of the invention.

FIGURE 2 is a cross sectional view taken on line 2—2 of FIGURE 1.

FIGURE 3 is an enlarged detail view, partly in sectional elevation and partly in elevation, as viewed from line 3—3 of FIGURE 2.

FIGURE 4 is an enlarged, fragmentary, longitudinal sectional view of a portion of the apparatus of FIGURE 1.

Referring to the drawings, the general assembly of the apparatus of the invention comprises a strut extension and retraction actuator portion, shown generally at 10, and a shock absorbing and springing strut portion, shown generally at 12, the actuator portion 10 and shock strut portion 12 of the assembly being coaxially slidably or telescopically interconnected by an intermediate coupling body, generally indicated at 14, all of which are hereinafter more fully described. While installations of the apparatus assembly may be varied in attitude to some extent, it is preferably maintained substantially vertical with the actuator portion 10 uppermost and, therefore, for convenience in the following description it will be assumed that the apparatus is disposed in such vertical position.

The actuator portion 10 of the assembly, which has a construction generally similar to that disclosed in the Chace Patent No. 2,997,985 except for certain modifications, will be first described.

The actuator portion 10 includes a hollow cylindrical actuator barrel 16 having a bore 18 therein, which is closed at its upper end by an end connector head 20, said head including a downwardly extending cylindrical coupling portion 28 which makes screwed connection with the upper end of the barrel at threads 22 and is locked in place thereon by means of an annular lock and nut 24. An O-ring seal is provided, as shown at 26, between the exterior of barrel 16 and the adjacent inner wall of the cylindrical portion 28 of the end connector head member 20. The end connector head 20 is formed with an axially extending lug 21, through which is provided a crosswise extending pivot bearing opening 30 of connection to a suitable structural component of a vehicle or aircraft, not shown.

The lower end of the actuator barrel 16 makes screwed connected by means of threads 32 into the upper cylindrical portion 34 of the before mentioned hollow, generally cylindrical coupling body 14, such screwed connection being secured by means of an annular lock nut 38. An O-ring seal 40 is provided between the lower exterior of the actuator barrel 16 and the adjacent inner wall of the upper cylindrical portion 34 of the coupling body 14.

A threaded inlet-outlet port 42 is provided through the upper end connector head 20, communicating with the upper end of the bore 18 of barrel 16, and a similar threaded inlet-outlet port is provided at 44 through an intermediate section of the cylindrical portion 34 of the coupling body 14, communicating with the lower end portion of the bore 18 of the actuator barrel 16, said ports 42 and 44 being adapted to be connected to suitable piping for admission of pressure fluid to and the exhausting thereof from the respective ends of the barrel bore 18 for extension and retraction actuation of the actuator portion of the mechanism. The upper and lower ends of the barrel 16 are formed with beveled end surfaces, as shown at 46 and 48, respectively, the purpose of which in connection with an actuator piston locking mechanism therein will be described hereinafter.

The intermediate section 34 of the coupling body 14 is formed with an intermediate bore portion 50 of slightly reduced inside diameter relative to the threaded portion 32, and the lower end portion thereof is formed with a still further reduced inside diameter bore 52, through which a hollow, cylindrical, tubular strut member 54 coaxially slidably extends into the lower end of bore 18 of the actuator barrel 16. An O-ring 17 and backup ring 19 are provided in an annular groove 23 formed around the inside of bore 52 for making a sliding seal with the exterior of the strut member 54. Threadedly connected to the upper end of the strut member 54 by threads 56 is an actuator piston head assembly, shown generally at 58.

The basic structure of the piston head assembly 58 comprises two generally annular, upper and lower L-sectioned head members, shown generally at 60 and 62, respectively, coaxially screw coupled together at 64 to form a generally spool shaped piston head structure.

The upper L-sectioned half 60 of the piston head is provided with a coaxial servo-cylinder bore 66b, and the lower L-sectioned half 62 of the piston head is provided with a similar coaxial servo-cylinder bore 66a, said bores being separated from one another at their inner adjacent ends by an intermediate wall 70.

The L-sectioned halves 60 and 62 of the piston head are similar to one another in construction and are each formed with four, diametrically opposite, radially directed guide bores therethrough, as shown at 72a and 72b, through each of which guide bores radially slidably extends a cylindrical locking dog shank, as shown at 74a and 74b. The outer end of each of the locking dog shanks carries an integrally formed, segmental shaped locking dog, as shown at 76a and 76b, the shanks 74a and locking dogs 76a being best shown in FIGURE 2. When in retracted position, as the locking dogs 76b are shown in FIGURE 1, the several segmental locking dogs lie flush within the corresponding outwardly facing, annular grooves formed around the periphery of each of the L-sectioned halves 60 and 62 of the piston head 58, such annular groove being shown at 78a in FIGURE 2. Each of the segmental locking dogs 76a and 76b is formed with a beveled outer peripheral edge surface, as shown at 80a and 80b, respectively, such edge surfaces having angles which are such as to make mutual bearing contact with the corresponding beveled surfaces 48 and 46 of the respective ends of the cylinder 16. When the dogs are in their extended locking positions in either end of the cylinder, the bevel surfaces 80a or 80b thereof, as the case may be, are positioned in engagement with the corresponding bevel surfaces 48 or 46 of the ends of the cylinder 16, and thus the corresponding dogs will lock the piston at the end of its stroke in either such end of the cylinder 16. FIGURE 1 illustrates the piston head in locked position in the lower end of the cylinder 16. The mutually contacting bevels between the locking dogs and the ends of the cylinder are at such angles with relation to the direction in which the piston head is urged under operating conditions, that sliding movement tends to occur at the mutually contacting beveled surfaces, which results in radial forces tending to urge the dogs inwardly into retracted position, and such inward retraction will occur unless the locking dogs are positively locked in their extended positions. Means are provided for extending and positively locking the locking dogs in such extended positions and for permitting retraction of the locking dogs, which is similar to that disclosed in the hereinbefore mentioned Chace Patent No. 2,997,985 and which will now be briefly described.

The locking means for the locking dogs includes toggle links 82a and 82b pivotally engaging at their outer rounded ends in correspondingly rounded seats 84a and 84b formed in the inner ends of locking dog shanks 74a and 74b, and the inner rounded ends of which toggle links are similarly pivotally supported in correspondingly rounded seats 86a and 86b formed in corresponding end portions of axially reciprocable fulcrum members 88a and 88b. The toggle links 86a and 86b are thus rendered angularly rockable between the radially extending, aligned positions, as shown at 82a, at the left hand or lower end of the piston head 58, in which position the axes of the toggle links and the locking dog shanks are in locking alignment with one another, and the retracted disaligned positions shown at 82b at the right hand or upper end of the piston head 58, in which the axes of the toggle links and the locking dog shanks are in unlocked positions, out of alignment with one another, such positions depending upon whether the piston head is located in the lower end or upper end respectively of the cylinder bore 18.

A pair of similarly constructed servo-pistons 90a and 90b are axially slidably contained within the before mentioned servo-cylinder bores 66a and 66b, respectively, the oppositely outwardly projecting ends thereof carrying the before mentioned axially reciprocable fulcrum members 88a and 88b. The servo-pistons 90a and 90b are urged in opposite axial directions in their cylinders by means of helical springs 94a and 94b, such springs acting under compression against the before mentioned intermediate separator wall 70. The inner ends of the servo-cylinders 66a and 66b are vented through ducts 98a and 98b, respectively, to the opposite ends of the piston head assembly 58. The outer ends of the servo-cylinders and the fulcrum ends of the servo-pistons therein are exposed to the fluid pressure applied to the corresponding ends of the cylinder 16.

The lower L-sectioned half 62 of the piston head assembly is formed with an outwardly facing, peripheral groove, in which is installed an O-ring seal 100 which serves as the main sliding seal between the piston head assembly and the bore 18 of the cylinder 16.

The fulcrum end portion 88b of the servo-piston 90b is formed with a relatively short axially projecting plunger member 102 having a conical point 104 formed on its outer end. The cylinder end connector cap 20 is provided with an internal, coaxial, cylindrical recess 106 adapted to receive the pointed end portion 104 of the plunger member 102 when the piston head assembly 58 is in locked position in the upper or right hand end of the cylinder, for actuation of a lock signaling device, which will be hereinafter more fully described.

The shock absorbing and springing strut portion 12 of the assembly will next be described. As hereinbefore mentioned, the lower end of the actuator barrel 16 makes screwed connection at threads 32 in the upper cylindrical portion 34 of the hollow, generally cylindrical coupling body 14 which is formed with an intermediate bore portion 50 of slightly reduced inside diameter relative to the threaded portion 32, and the lower end portion of the coupling body is formed with a still further reduced inside diameter bore 52 through which the before mentioned hollow, cylindrical strut member 54 coaxially slidably extends into the lower end of bore 18 of the before mentioned cylinder 16. An internal, upwardly facing annular shoulder 108 is formed at the juncture of the bores 50 and 52, against which the downwardly facing, annular peripheral marginal portion 110 of the lower L-sectioned portion 62 of the cylinder head makes abutting engagement, as shown in FIGURE 1, when the cylinder head assembly 58 is locked in the lower end of the cylinder bore 18, as shown in FIGURE 1.

Retained against an upwardly facing annular shoulder 55 within the upper end portion of the cylindrical strut member 54 by a lower sleeve shaped portion 57 of the piston assembly, which makes threaded connection at 56 with the cylindrical strut member 54, is a coaxial, generally cylindrical downwardly extending sleeve member 112 terminating at its lower end in an integrally formed stationary annular plunger head 114. The sleeve 112 has an outside diameter which is substantially less than the inside diameter of the adjacent portion of the cylindrical strut member 54, thereby forming an elongated clearance space 116 therebetween. A plurality of ducts, as shown at 118 and 119, interconnect the upper inside end portion of the sleeve 112 with the aforesaid clearance space 116. Annular plunger head 114 is provided with an inner, inwardly facing annular groove 120 containing a U-sectioned annular packing ring 122 preferably made of a suitable plastic material such as "Teflon," backed by an elastomeric ring 124, which serves to urge the ring 122 inwardly of the groove 120 into sliding sealing engagement with the outside cylindrical surface of a tubular strut plunger 126. The external cylindrical surface of the annular plunger head member 114 is provided with an outwardly facing, annular groove 128 containing an O-ring seal for forming a fixed fluid seal between the before mentioned external cylindrical surface of the plunger head member 114 and the internal cylindrical surface of the hollow, cylindrical strut member 54.

The annular plunger member 114 is provided with a plurality of ducts extending generally axially therethrough, one of which is shown at 130, the lower ends of which ducts are formed with internally threaded enlarged cylindrical recess portions into each of which are threaded a ball check valve body, as shown at 132, such ball check body containing a check ball valve 134 adapted to seat on a downwardly facing, annular valve seat 136, thereby permitting fluid flow through the duct 130 in the direction indicated by arrow 138, but preventing fluid flow in the opposite direction.

The lower end of the cylindrical strut member 54 is provided with a high pressure fluid seal, shown generally at 140. The high pressure seal 140 comprises a generally annular gland 142 threaded at 144 into the lower end of the cylindrical strut member 54. The annular gland 142 is formed with an inwardly facing, annular groove 145 containing a channel-sectioned annular seal ring 148 similar to ring 122 and backed by and pressed inwardly into sliding sealing engagement with the exterior cylindrical surface portion 150 of the before mentioned strut plunger 126 by means of an elastomeric O-ring 152. An O-ring seal is provided, as shown at 154, to form a fixed fluid seal between the adjacent external cylindrical surface of the gland 142 and the internal surface of the bore 156 of the before mentioned cylindrical strut member 54. The lower end of the gland 142 is formed with a counterbored terminal portion having formed on the interior thereof a snap ring groove 160 containing a snap ring 162 which serves to retain therein a scraper ring 164.

The tubular strut plunger 126 is provided at an intermediate section thereof with an integrally formed annular piston 166, the outer cylindrical surface of which is in sliding engagement with the bore 156 of the strut member 54. The outer cylindrical surface 168 of the annular piston 166 is formed with an outwardly facing annular groove 170, which contains a metal piston ring 172 which is pressed into sliding sealing engagement between the groove 170 and the before mentioned inner cylindrical surface of the bore 156 of the strut member 54. The annular piston member 166 is also provided with a plurality of ducts, as shown at 174, which extend generally axially through the piston 166 from one side to the other, and each of such ducts 174 contains threaded therein a metering plug 176, through which extends a metering orifice 178 for controlling the rate and resistance to flow of fluid therethrough from one side to the other of the annular piston 166.

The lower end of the strut plunger 126 is provided with a lower end-connector cap 180, the connection therebetween being preferably by means of welding, as indicated at 182. End-connector head cap 180 is formed with an axially extending lug portion 184 through which transversely extends a bore 186 containing therein a swivel, end-connector bearing assembly 188 adapted to make pivotal connection to a structural portion of a vehicle or aircraft running or landing gear.

Coaxially contained in and forming an integral portion of the strut plunger 126 is a pair of parallel tubular members 190 and 192, the lower ends of which make welded connection within cylindrical recesses 194 and 196 formed in the inner end surface of the end-connector cap 180. The upper ends of the inner tubular members 190 and 192 together with the upper end of the tubular strut piston 126 extend through and make welded connection to a plunger end closure member 198 with tubular member 190 projecting a short distance above the top surface 200 thereof, as shown at 204. The plunger end closure member 198 carries an integrally formed, upwardly extending cylindrical stop flange 202, through which has been cut a plurality of radial slots 203 to form thereby a crown shaped stop member for limiting, as indicated by the phantom lines 207, the upward stroke of the strut plunger 126 by impingement thereof upon the inner end surface 206 of the piston head.

The end-connector cap 180 is provided with a duct 210 extending from the exterior thereof into communication with the interior of the inner tubular member 192, the outer end portion of such duct being formed with a slightly increased diameter threaded portion, as shown at 212, for receiving therein a closure plug 214. The lower end-connector cap 180 is also provided with another duct 216 extending from the exterior thereof into communication with the interior of the inner tubular member 190, the outer portion of such duct being of slightly increased diameter and being threaded, as shown at 218, to receive an air valve plug assembly 220. The air valve plug assembly 220 includes an outwardly extending, externally threaded valve stem 222 which contains therein a conventional high pressure type check valve core (not shown) which permits air to be introduced therethrough into the tubular member 190 and thence into the upper end of the strut, as hereinafter more fully described. A valve cap 224 closes the threaded inlet end of the valve stem 224 and upon its removal provides a means for making connection to a supply of high pressure air.

Referring next primarily to FIGURE 2 which, as before mentioned, is an enlarged cross sectional view taken on line 2—2 of FIGURE 1, the intermediate coupling section, shown generally at 14, is formed on the exterior with a flat surface 226, upon which is mounted a switch adapter fitting 228. The switch adapter fitting 228 is provided with a base flange 230, which seats upon the flat surface 226 and is bolted thereon by means of a plurality of stud bolts 232. Formed integrally with the adapter fitting 228 and extending coaxially downwardly below the flange 230, is a tubular plunger guide member 234. The plunger guide member 234 extends into a radial opening 236 through the wall of the intermediate coupling section 14 into the intermediate bore portion 50 of the intermediate coupling section 14. The bore portion 50 is formed with a plunged counterbore 238 symmetrically intersecting the inner end of the opening 236. Contained within the arcuate recess formed by the plunged counterbore 238 is a segmental signal switch actuator shoe 240. Extending from the actuator shoe 240 is a pin 242, which extends radially slidable through the bore of the plunger guide member 234, with the upper end thereof extending into a cylindrical recess 244 within the switch adapter fitting 228 and retained therein with freedom for limited radial sliding movement by means of a snap ring 246 fitted into an annular ring groove 248 adjacent the upper inner end of pin 242.

The upper cylindrical portion 250 extending upwardly from the base flange 230 of the switch adapter fitting 228 is provided with a coaxial bore portion 252, which is an increased inside diameter extension of the before mentioned cylindrical recess 244. The upper portion of the bore portion 252 is provided with internal threads 254 for reception of the lower threaded nipple portion 256 of a lost motion coupling section 272a of a safety signal switch assembly, shown generally at 258a. Threaded into an intermediate portion of the bore 252 of the switch adapter fitting 228 is a retainer bushing 260 having a push rod guide bore 262 extending coaxially therethrough. The lower end of the retainer bushing 260 seats upon the upper surface of a washer 264, the lower marginal edge portion of which washer in turn is seated upon an upwardly facing annular shoulder 265 formed at the juncture of the cylindrical recess 244 and the bore 252.

Extending coaxially slidably out through the nipple portion 256 from within the lost motion coupling section 272a is a slender push rod 266a. Said push rod extends through the push rod guide bore 262 of the retainer bushing 260 and thence through the central aperture of the washer 264 into endwise actuating engagement with the upper end surface of the pin 242 of the actuator shoe 240. O-ring seals are provided, as shown at 268 and 270, to provide a high pressure fluid seal between the push rod 266a and the bushing 260, and between the bushing and the bore 252 of the switch adapter fitting. High pressure fluid, which reaches the cylindrical recess 244, is thus retained therein and prevented from entering the clearance spaces in the upper portions of the bore 252 of the switch adapter fitting 228 and from entering coupling section 272 and the safety switch assembly 258a thereabove, while at the same time maintaining sufficient freedom for radial sliding movement of the push rod 266a for actuation of the safety switch.

The upper end of push rod 266a is operatively coupled through an intermediate lost motion coupling section, shown generally at 272a to a hermetically sealed electrical switch (not shown), preferably of the "micro-switch" type which, as before mentioned, is contained within the housing 274 of the safety switch assembly 258. Contained within the lost motion coupling section and attached to the top end of push rod 266a is a cylindrical sleeve member 300, which is axially slidably contained within bore 302 of the lower threaded nipple portion 256 of the coupling section 272. The cylindrical sleeve member 300 is provided at its lower end with a radial flange portion 304, against which a helical spring 306 acts to bias the sleeve member 300 and the push rod 266a in a radially inward direction and which, in turn, biases the pin 242 and segmental actuator shoe 240 likewise into their maximum inward position relative to the plunged bore recess 238 within the bore 50. The upper end of the helical spring 306 acts against an annular shoulder 308, which forms a downwardly projecting portion of the housing 274 of the safety switch assembly 258. The housing 274 is removably attached to the upper end portion of the coupling section 272a, from which the before mentioned threaded nipple portion 256 extends, by means of a union connection consisting of a union nut 312 screwed onto the upper portion of the section 272a.

Suitable electrical connections to the before mentioned switching mechanism within the housing 274 enter the upper end of the housing, as shown at 314.

The before mentioned cylindrical sleeve member 300 of the lost motion coupling section is formed with an inner coaxial bore containing axially slidable within the upper end portion thereof a switch actuator plunger 316, said plunger 316 being biased upwardly within the bore of the sleeve member 300 by means of a helical spring 318. The upper end of the switch actuator plunger 316 is thereby retained in operating engagement with the lower end of a switch actuating rod 320, which extends downwardly from within the housing 274. The cylindrical sleeve member 300 and the switch actuator plunger 316 permit the switch actuating rod 320 to be moved by the motion of the push rod 266a under the force of the spring 318 sufficiently to actuate the switch. Any excess in the movement of the push rod 266a, as applied thereto by means of the segmental actuator shoe 240 through the pin 242 is thereby taken up by rotative axial movement between the sleeve 300 and the plunger 316, and damage which might otherwise result to the switching mechanism is thereby obviated.

In operation of the signal switch mechanism, the actuator shoe 240 rests upon the outer cylindrical surface of one or more of the segmental locking dogs 76a depending upon the relative rotational position of the intermediate coupling member 14 and the piston head assembly 58 and is moved radially therewith by corresponding radial movement of the locking dogs 76a and locking dog shanks 74a between locked and unlocked positions thereof relative to the ends of the cylinder 16, as hereinafter described in connection with the operation of the apparatus. Such radial movement is thereby transferred through the push rod 26a and through the before described lost motion coupling section 272a to the switch mechanism within the switch assembly 258, thereby to indicate by actuation of the switch and a suitable signaling means connected thereto, whether or not the piston assembly 58 has arrived and is positioned at the end of the bore 18 with the locking dogs 76a completely extended into locking position, as illustrated in FIGURE 1, in which position the beveled edge surfaces 80a on the locking dogs are in locking abutment with the correspondingly beveled edge surfaces 48 on the end of the cylinder 16, whereby the piston head 58 is restrained from axial movement in the cylinder 16.

The end-connector head 20 is formed on one exterior side thereof with a flat surface 280, and extending radially inwardly therefrom is an internally threaded bore 282, into which is threadedly connected the threaded nipple portion 256b of a lost motion coupling section 272b, which may have a construction identical to that of the coupling section 272a hereinbefore described. Also contained within a radially inwardly extended portion of the internally threaded bore 282 is an assembly of parts, including a push rod retainer bushing 260b, identical to that hereinbefore described in connection with the switch adapter fitting 228, including a slender push rod 266b which extends coaxially slidably out through the nipple portion 256b from within the lost motion coupling section 272b. Extending further radially inwardly from the inner end of the extension of the bore 282 is a radial rod bore 284 which intersects the inner cylindrical recess 106 formed coaxially on the inner side of the end-connector head 20. Axially slidably contained within the rod bore 284 is an elongated push rod 288 formed with an increased diameter head 290 on its outer end, the outer side of which is normally positioned in abutment with the lower end of the before mentioned push rod 266b. The inner end of the push rod 288 is rounded, as shown at 292, for actuating contact with the pointed end 104 of plunger member 102 extending axially from the fulcrum member 88b.

The preparation for and operation of the unitary retractable shock strut apparatus of the invention is as follows.

With the piston head 58 positioned in either end of the actuating cylinder 16, whichever position may be the most convenient under the prevalent installation conditions, the whole retractable strut assembly is positioned in an approximately vertical attitude with the upper end-connector head 20 uppermost. Next, with the strut plunger positioned in its fully retracted condition, in which position the upper end of the slotted stop flange 202 is in abutment with the inner end surface 206 of the piston head, as illustrated in phantom lines at 207, and with plug 214 and air valve assembly 220 removed from the end-connector cap 180, a suitable hydraulic fluid such as, for example, oil is introduced through the duct 210 and thence up through the tubular member 192 into the upper end of the strut cylinder 54. From the upper end of the strut cylinder 54 the thus introduced oil flows through the slots in the stop flange 202, through the apertures 118 and 119 into the annular space 116 between the sleeve 112 and the bore 156 of the strut cylinder 54 and thence through the plurality of ducts 130 past the check valves 132, 134 into the annular working spaces 143 and 147 between the bore 156 of the strut cylinder 54 and the adjacent exterior of the strut plunger 126 above and below the annular piston member 166. Oil is continued to be slowly introduced through the duct 210 and up through the tubular member 192 until the before mentioned annular spaces are filled and the oil level rises within the upper end of the strut cylinder 54, on top of the top surface 200 of the plunger end member 198 sufficiently to overflow into the top extension 204 of tubular member 190, evidence of such condition being indicated by the flow of oil through the duct 216, 218. Slow mechanical or manual cycling of the strut plunger 126 axially within the strut cylinder 54 during such filling operation may be helpful in distributing the oil throughout the strut and purging it of entrained and entrapped air.

Following the hereinbefore described filling procedure, plug 214 and air valve assembly 220 are replaced in the end-connector cap 180 and a suitable source of high pressure air connected to the outer end of valve stem 222. Next, with application to the strut through the lower end of the end-connector cap 180 of a force equal to that normally to be supported by the strut mechanism when in use, air is introduced under pressure through the valve 220 until the pressure in the air space in the top of the strut cylinder 54 above the upper end of the strut plunger 126 is sufficient to extend the strut plunger against such force, a predetermined distance approximating that shown by way of example in FIGURE 1. In such position, the oil level at the upper end of the strut cylinder 54 covering the upper end of the strut plunger 126 will be approximately as shown in dotted lines at 294, the space thereabove being filled with air under sufficient pressure to maintain the strut under such loaded conditions in the normally intermediately extended position shown.

Upon subjecting the strut to rapidly varying loads, such as those encountered in operation, the strut plunger 126 is forced to correspondingly reciprocate axially relative to the strut cylinder 54, thereby imparting correspondingly axial reciprocatory motion of the annular piston 166 in the tubular working space between the bore 156 of the strut cylinder 54 and the exterior of the strut plunger 126 and between the upper end of the gland 142 and the lower end of the annular plunger head member 114, each such movement requiring the displacement of the fluid between upper and lower portions 143 and 145 of the aforesaid annular space, through the ducts 174 and metering orifices 178 in the annular piston 166. It is an important advantage of this construction of the shock absorbing strut that the oil in the working annular spaces 143 and 145 above and below the annular piston 166 is out of contact with and separated from the air in the top of the cylinder, by means of which the strut is maintained in properly and normally extended condition. With the fluid in the working portion of the strut thus separated from the air, it cannot become aerated with resultant impairment and deterioration of the shock absorbing properties of the device, as is prevalent in the more conventional combination suspension and shock absorbing struts, in which the fluid and pressure air are usually so arranged as quickly to become at least partially intermixed upon subjecting the shock absorbing system to rapidly repeated shocks.

In operation, the annular space 116 between the sleeve 112 and the bore 156 remains filled with fluid at all times up to a level at least as high as the lowermost one of the apertures 118 and thus, however severe the reciprocating movements of the annular piston 166 may be, air cannot be drawn down through the check valves 132, 134 into the working portions 143 and 145 of the annular working cylinder space above and below the piston 166, and thereby maintenance of the working portion of the cylinder completely filled with fluid at all times is assured.

The operation of the strut actuator portion of the apparatus of the invention is as follows.

To retract the strut from the fully extended locked position, as shown in FIGURE 1, fluid pressure is supplied to port 44, while at the same time permitting fluid to be exhausted through the port 42 from the upper end of the actuator cylinder. Such application of pressure through port 44 results in sufficient pressure being applied to the exposed lower end of the servo-piston 90a to cause it to move upwardly in the cylinder 66a against the force of helical spring 94a, the upper end of the servo-cylinder 66a being at such time vented through duct 98a to the opposite upper side of the actuator piston head assembly 58 where the fluid pressure is relatively lower. Such upward movement of the servo-cylinder 98a carries with it the fulcrum member 88a thereby pivoting the toggle links 82a from their axially aligned positions, shown in FIGURE 1, to positions out of alignment with the locking dog shanks 74a thereby releasing and freeing the locking dog shanks 74a and the locking dogs 76a for radially inward sliding motion. The hydraulic fluid pressure admitted through port 44 also acts on the lower effective annular area of the piston assembly 58, which is the annular area between the outside diameter of the strut 54 and the inside diameter of the barrel 16, tending to move it upwardly in the bore 18 of the actuating cylinder 16, with the result that the forces between the mutually contacting beveled edges 80a of the locking dogs 76a and the bevelled shoulder 48 at the end of the cylinder 16 causes the thus released locking dogs to move radially inwardly into retracted position in groove 78a, thereby freeing the piston at 58 for movement upwardly in the cylinder 16.

When the piston head assembly 58 reaches the extreme upper end of the cylinder 16, the servo-piston 90b acting under the force of helical spring 94b and also the pressure applied on the lower end of the servo-piston 90b through the vent passage 98b will cause upward movement of the said servo-piston 90b carrying upward with it the fulcrum member 88b, and the toggle links 82b are thereby pivoted into axial alignment with the locking dog shanks 74b thereby moving the locking dogs 76b outward and locking them in locking engagement with the upper end of the cylinder 16, the beveled edges 80b of the locking dogs being then in locking engagement with the corresponding beveled edge 46 on the upper end of the cylinder 16. The piston assembly 58 and the strut cylinder 54 will thus be locked in their fully retracted position and maintained there independent of supporting hydraulic pressure until application of fluid pressure through the port 42 to the upper end of the cylinder effects release of the locking dogs and permits the piston head 58 and depending strut cylinder 54 to move downward in the cylinder 16 in a manner opposite to that hereinbefore described for the retraction operation.

As the piston head assembly 58 reaches the upper end of the actuator cylinder 16, as hereinbefore described, the plunger member 102 enters the cylindrical recess 106 in the cylinder end-connector cap head 20, the pointed end 104 of the plunger member 102 thereby contacting the lower rounded end 292 of the push rod 288 and thereby forcing it upwardly within the radial bore 284 thereby also pushing push rod 266b upwardly to actuate through the lost motion coupling section 272b the safety switch within the switch assembly 258b. Such actuation of the safety switch produces a signal, which indicates that the actuator piston head 258 has reached its fully retracted position within the upper end of the actuator cylinder 16.

When the actuator piston head 58 is moved toward the opposite end of the actuator cylinder 16 and reaches its extreme lower position therein, the resultant radial outward locking movement of the locking dogs 76a brings one or more of them into contact with the underside of the actuator shoe 240, with the result that the actuator shoe 240 and the pin 242 is caused to move upwardly, thereby also moving the push rod 266a upwardly to actuate the safety switch in the safety switch assembly 258a. Such actuation of the safety switch is thus an indication that the actuator piston head 58 has reached its lowermost locked down position within the actuator cylinder 16 and that the locking dogs 76a have completed their movement outwardly into locking engagement with the beveled end 48 of the cylinder 16.

In most installations of the retractable strut assembly of this invention, rotation about their common longitudinal axis of the actuating cylinder 16 and the strut plunger 126 will be prevented by the structural elements, to which the upper end-connector head 20 and the lower end-connector cap 180 are pivotally attached, but the intermediate strut cylinder 54 and piston head assembly 58 are not so restricted. Therefore, in operation it is possible for the intermediate cylinder 54 and piston head assembly 58 to move or wander rotationally relative to the actuator cylinder 16 and strut plunger 126 thereby angularly displacing the locking dogs 76a relative to the safety switch assembly 258a. This possible variation in angular rotational relative positioning between the locking dogs 76a and the switch assembly 258 is taken care of by the hereinbefore described mechanism including the relatively circumferentially long segmental actuator shoes 240 contained within the recess formed by the plunged counterbore 238. Thus, regardless of the angular relationship between the locking dogs 76a and the segmental actuator shoe 240, such shoe will always be in operative position with respect to the outer edges of one or more of the locking dogs.

It is to be understood that the foregoing is illustrative only and that the invention is not limited thereby, may include various modifications and changes made by those skilled in the art within the scope of the invention, as defined in the appended claims.

What is claimed is:

1. In a shock absorbing strut device, apparatus comprising:
   a hollow cylinder having a cylindrical bore therein;
   a cylinder head closing the upper end of said bore;
   a plunger member extending axially slidably into the lower end of said bore, said plunger member having an outside diameter less than the inside diameter of said bore, there being an inner annular space thereby formed between the exterior of said plunger member and said bore;
   annular fluid seal means adjacent the lower end of said cylinder closing the lower end of said annular space and through which said plunger member axially slidably extends into said bore;
   an annular head member fixed in an intermediate section of the said interior of said cylinder and there bridging said annular space, said plunger being sealingly slidable through said annular head member;
   an annular piston member fixed coaxially to an intermediate section of the exterior of said plunger member and slidable axially therewith in sealing engagement with said bore and along a working portion of said annular space which extends axially between said fluid seal means and said annular head member;
   passage means extending through and interconnecting opposite ends of said annular head member;
   and means in said passage means arranged to permit fluid flow therethrough from the upper head end of said cylinder in one direction into said working portion of said annular space, but to prevent fluid flow therethrough in the opposite direction.

2. In a shock absorbing strut device, apparatus comprising:
   a cylinder having a cylindrical bore therein;
   a cylinder head closing the upper end of said bore;
   a cylindrical plunger member extending axially slidably into the lower end of said bore, said plunger member having an outside diameter less than the inside diameter of said bore, there being an annular space thereby formed between said plunger member and said bore;
   annular fluid seal means adjacent the lower end of said cylinder closing the lower end of said annular space and through which said plunger axially extends into said bore;
   an annular sleeve member fixed adjacent one end thereof to an upper end portion of said cylinder and extending coaxially downwardly within the said bore to an intermediate section thereof, said sleeve member being sized and positioned to form an annular clearance space between the exterior of said sleeve member and said bore;
   an annular head member fixed to the lower end portion of said annular sleeve member and there bridging the said annular space, said plunger being axially slidable through said annular head member and there being formed thereby a closed annular working cylinder space of constant volume between said annular seal means and said annular head member;
   passage means extending through said annular sleeve member axially upwardly spaced from said head member, interconnecting said annular clearance space and the space in said cylinder into which the upper end of said plunger member extends;
   an annular piston member fixed coaxially to an intermediate section of the exterior of said plunger member and slidable axially therewith in said annular working cylinder space;
   and restricted passage means extending through said annular head member and interconnecting said annular working cylinder space and said clearance space surrounding said sleeve member.

3. Apparatus according to claim 2 and means in said passage means extending through said annular head member to permit fluid flow therethrough from said annular clearance space surrounding said sleeve member in one direction into said annular working cylinder space, but to prevent fluid flow therethrough in the opposite direction.

4. In a shock absorbing strut device, apparatus comprising:
   a hollow cylinder having a cylindrical bore therein;
   a cylinder head closing the upper end of said bore;
   a tubular plunger member extending axially slidably into the lower end of said bore, said plunger member including therein a pair of substantially coextensive inner tubular members;
   fluid sealing means adjacent the lower end of said cylinder through which said plunger member axially slidably extends into said bore, said plunger member having an outside diameter less than that diameter of said bore, thereby forming an annular space between said plunger and said bore within said cylinder;
   a plunger end-connector fixed to and closing the lower ends of said tubular plunger member and inner tubular members;
   a closure member fixed to the upper, inner ends of said plunger member and said tubular members and closing the space therebetween;
   a duct extending from the exterior through said plunger end-connector means into communication with one of said inner tubular members;
   another duct extending from the exterior through said plunger end-connector means communicating with the other of said inner tubular members;
   an annular head member fixed in an intermediate section of the interior of said cylinder and there bridging the said annular space, said plunger being slidable through said head member and there being formed thereby a closed variable volume chamber in the head end of said cylinder above said plunger and a closed annular space of constant volume in said outer annular space extending axially between said fluid sealing means and the lower end of said annular head member;
   and restricted passage means extending through and interconnecting opposite ends of said annular head member.

5. In a shock absorbing strut device, apparatus comprising:
   a cylinder having a cylindrical bore therein;
   a cylinder head closing the upper end of said bore;
   a tubular plunger member extending axially slidably into the lower end of said bore, said plunger member having an outside diameter less than the diameter of said bore, thereby forming an annular space between said plunger member and said bore;
   a first and a second substantially axially coextensive inner tubular member within said plunger member, there being an inner space between said inner tubular members and the interior of said plunger member;
   fluid seal means adjacent the lower end of said cylinder closing the lower end of said annular space and through which said plunger member axially slidably extends into said bore;
   a plunger end-connector to which the lower ends of said plunger member and inner tubular members are closingly fixed;

a closure member fixed to the upper ends of said tubular members and there sealingly bridging the space between said plunger member and the said inner tubular members, the upper ends of said tubular members being in communication with the interior upper end portion of said cylinder;

a first duct extending from the exterior of said plunger end-connector means into communication with the lower end of said first inner tubular member;

a second duct extending from the exterior of said plunger end-connector means into communication with the lower end of said second inner tubular member;

an annular head member fixed in an intermediate section of the bore of said cylinder and there bridging said annular space, said plunger member being slidable through said head member;

a radially extending, annular piston member fixed coaxially to an intermediate section of the exterior of said tubular plunger member and slidable axially therewith in sealing engagement with the said bore along a portion of said annular space which extends axially between said fluid seal means and the lower end of said annular head member;

and restricted passage means extending through and interconnecting opposite ends of said annular piston member.

6. Apparatus according to claim 5 in which the upper end of said second tubular member projects upwardly a predetermined distance above the upper end of said first tubular member, whereby upon introduction of fluid through said first duct and first tubular member into the space in said cylinder above the upper end of said plunger member, return of fluid out through said second tubular member and said second duct will be indicative of the completion of filling of said device with such fluid.

7. Apparatus according to claim 5 and an annular, radially perforate means extending axially upward from the upper inner end of said tubular plunger member adapted to contact the inner end of said cylinder head, thereby to limit the upward stroke of said plunger member within said cylinder and together with the volume of said inner tubular member to determine the initial minimum air space therein.

8. In a shock absorbing strut device, apparatus comprising:

a cylinder having a cylindrical bore therein;

a cylinder head closing the upper end of said bore;

a tubular plunger member extending axially slidably into the lower end of said bore, said plunger member including therein a pair of substantially axially coextensive inner tubular members;

fluid seal means adjacent the lower end of said cylinder through which said plunger member axially slidably extends;

a plunger end-connector fixed to and closing the lower ends of said plunger member and tubular members;

a duct extending from the exterior through said plunger end-connector means into communication with the interior of one of said inner tubular members;

another duct extending from the exterior through said plunger end-connector means into communication with the interior of the other of said inner tubular members;

an annular sleeve member fixed adjacent one end thereof to an upper end portion of said cylinder and extending coaxially downwardly within said outer annular space intermediate the exterior of said plunger member and said bore of said cylinder, to an intermediate section thereof, said sleeve member being positioned to form an annular clearance space between said sleeve member and said bore of said cylinder;

an annular head member fixed to the lower end of said annular sleeve member and there bridging said annular space between said exterior surface of said plunger and said bore of said cylinder, said plunger being slidable therethrough;

an annular piston member fixed coaxially to an intermediate section of the exterior of said tubular plunger member and slidable axially therewith in the portion of said annular space between the exterior of said plunger member and the bore of said cylinder which extends between said fluid seal means and the lower end of said annular head member;

and restricted passage means extending through and interconnecting opposite ends of said annular piston member.

9. In a shock absorbing strut device, apparatus comprising:

a hollow cylinder having a cylindrical bore therein;

a cylinder head closing the upper end of said bore;

a tubular plunger member extending axially slidably into the lower end of said cylinder, said plunger member having an outside diameter less than the diameter of said bore, thereby forming an annular space therebetween;

annular fluid seal means adjacent the lower end of said cylinder closing the lower end of said annular space, through which said plunger member axially slidably extends into said bore;

a pair of inner tubular members contained within and substantially axially coextensive with said tubular plunger member, the upper ends thereof communicating through the upper end of said plunger member with the upper end of said cylinder;

a plunger end-connector fixed to and closing the lower ends of said plunger member and inner tubular members;

a duct extending from the exterior through said plunger end-connector means into communication with one of said inner tubular members;

another duct extending from the exterior through said plunger end-connector means communicating with other of said inner tubular members;

an annular sleeve member fixed adjacent one end thereof to an upper inner end portion of said cylinder and extending coaxially downwardly within said bore, to an intermediate section thereof, said sleeve member being sized and positioned to form an annular clearance space between the exterior of said sleeve member and the adjacent surrounding portion of said bore;

an annular head member fixed to the lower end portion of said annular sleeve member and there bridging the said annular space between said exterior surface of said plunger member and said bore, said plunger member being axially slidable through said annular head member;

an annular piston member fixed coaxially to an intermediate section of the exterior of said plunger member and slidable axially therewith in sealing engagement with said bore and along a working portion of said annular space which extends between said fluid seal means and the lower end of said annular head member;

restricted passage means extending through and interconnecting opposite ends of said annular head member;

and check valve means in said passage means arranged to permit fluid flow therethrough from the upper end portion of said cylinder into said working portion of said annular space, but to prevent fluid flow therethrough in the opposite direction.

10. In a shock absorbing strut device, apparatus comprising:

an upper cylinder having an upper bore therein;

a cylinder head closing the upper end of said upper bore;

a tubular plunger member extending axially slidably into the lower end of said cylinder, said plunger member having an outside diameter less than the inside diameter of said upper bore, said plunger member having a lower bore therein;

annular fluid seal means adjacent the lower end of said upper cylinder through which said tubular plunger axially slidably extends into said upper bore;

a piston head fixed to and closing the upper end portion of said tubular plunger member, said piston head being axially slidable in said upper bore;

a lower plunger member extending axially slidable into the lower end of said upper tubular plunger, said lower plunger member having a diameter less than the inside diameter of said lower bore, there being an annular space thereby formed between said lower plunger member and said lower bore;

a lower annular fluid seal means adjacent the lower end of said lower plunger member, closing the lower end of said annular space, through which said lower plunger member axially slidably extends into said lower bore;

an annular head member fixed in said lower bore, and there bridging the said annular space between the said lower bore and the said lower plunger member, said lower plunger member being axially slidable through said head member;

an annular piston member fixed coaxially to an intermediate section of the exterior of said lower plunger member and slidable axially therewith in engagement with said lower bore along a portion of the said annular space which extends axially between said lower annular fluid seal means and said annular head member;

and restricted fluid passage means extending through and interconnecting opposite ends of said annular piston member.

11. Apparatus according to claim 10 and port means adjacent opposite end portions of said upper cylinder for troducing actuating fluid under pressure into either end of said upper bore and exhausting fluid from the opposite end thereof for moving said piston head and tubular plunger member axially of said upper cylinder.

12. Apparatus according to claim 11 and lock means for locking said upper piston head at either end of its axial travel in said upper bore, said lock means being actuatable to release said piston head by fluid pressure applied to either end of said bore for moving said piston head from one end of said bore to an opposite end thereof.

13. In an actuator having a cylinder and a piston axially reciprocable therein, including releasable means for locking said piston at a predetermined axial position in said cylinder, such locking device including a circumferentially extending shoulder in said cylinder and a plurality of segmental locking dogs radially slidable in said piston into and out of locking engagement with said shoulder, apparatus comprising:

a circumferentially extending recess formed in said cylinder circumferentially coextensive with at least a portion of said shoulder;

an arcuate shoe member in said recess and radially movable therein, said shoe member being thereby positioned to be abutted by the outer edge of at least one of said segmental locking dogs when said locking dogs are in radially extended piston-locking position relative to said shoulder, said shoe member being thereby moved radially in said recess;

a plunger extending radially outward from and movable radially by said shoe member through guide means in the wall of said cylinder;

signal means on said cylinder actuatable in response to radial movement of said plunger for indicating the presence or absence of said locking dogs in such piston-locking position, said signal means including a push rod radially slidable in radially extending guide means carried on the exterior of said cylinder, said push rod being thereby positioned to make end to end abutment with the outer end of said plunger and to follow the radial movements thereof, the diameter of said push rod being small relative to said plunger;

fluid seal means between said push rod and said guide means;

and resilient means biasing said push rod radially inwardly through said seal means and thereby urging said plunger and said locking dogs inwardly relative to said recess, said biasing being such as to exceed the outward force exerted on said push rod by the actuating fluid pressure in said cylinder.

References Cited by the Examiner

UNITED STATES PATENTS

| | | | |
|---|---|---|---|
| 2,295,961 | 9/42 | Meyer | 92—5 |
| 2,448,064 | 8/48 | Wallace | 244—102 |
| 2,702,024 | 2/55 | Harold | 92—5 |
| 2,764,132 | 9/56 | Bakke | 92—25 |
| 2,808,810 | 10/57 | Lindley | 92—5 |
| 2,967,513 | 1/61 | Chace | 92—25 |
| 3,011,777 | 12/61 | Stout | 267—64 |
| 3,033,556 | 5/62 | Wossner | 267—64 |

FOREIGN PATENTS 837,494   6/60   Great Britain.

SAMUEL LEVINE, Primary Examiner.

RICHARD B. WILKINSON, Examiner.